June 11, 1963   D. N. TRAVERS   3,093,827
THREE LOOP DIRECTION FINDER ANTENNA FOR SHIPBOARD USE
Filed Dec. 11, 1959   5 Sheets-Sheet 1

INVENTOR
DOUGLAS N. TRAVERS
BY
ATTORNEYS

INVENTOR
DOUGLAS N. TRAVERS
BY
ATTORNEYS

June 11, 1963 D. N. TRAVERS 3,093,827
THREE LOOP DIRECTION FINDER ANTENNA FOR SHIPBOARD USE
Filed Dec. 11, 1959 5 Sheets-Sheet 5

INVENTOR
DOUGLAS N. TRAVERS

BY
ATTORNEYS

United States Patent Office 3,093,827
Patented June 11, 1963

3,093,827
THREE LOOP DIRECTION FINDER ANTENNA
FOR SHIPBOARD USE
Douglas N. Travers, San Antonio, Tex., assignor, by mesne assignments, to the United States of America as represented by the Secretary of the Navy
Filed Dec. 11, 1959, Ser. No. 859,080
7 Claims. (Cl. 343—114)

This invention relates to a three loop direction finder antenna for shipboard use and more particularly to an apparatus for minimizing the distortion in direction finders due to electromagnetic reradiation from nearby objects such as the mainmast of a ship.

The current method for measuring medium frequency and high frequency radio direction finder bearings is to use a rotating loop antenna. The direction finder bearing is taken to be along the axis of the loop when the output signal of the loop reaches a minimum. The chief disadvantage of this existing method is that it allows the field reradiated from a nearby vertical reradiating object to influence the accuracy of the measured bearings so that accurate direction finding is almost impossible above a frequency of 8 megacycles. In the existing method due to 180° ambiguity of the indicated bearing, it is necessary to resolve the ambiguity with an additional sensing circuit which cannot be used at the same time as when the bearing is being measured.

This invention includes a direction finder antenna which consists of three vertical loop antennas, two of which are located coaxially and the third with its axis at right angles to the coaxial axis and intersecting the coaxial axis at a point midway between the two coaxial loop antennas. The output signal of the central loop is fed through a ±90° phase shift and an R.F. attenuator, then combined with the output signal from the two coaxial loops and fed to the input of the direction finder receiver. The central loop antenna is called the sense loop and the R.F. attenuator is referred to as the sense gain control. The two coaxial loops are referred to as the spaced loop pair. The antenna assembly is operated by rotating it at a high speed and measuring the direction finder bearing by noting the direction of the axis of the central loop after adjusting the sense gain control so that the nearby vertical reradiator lies in a direction of minimum response to the antenna array other than the direction of minimum response used to determine the direction finder bearing.

The chief advantage of this antenna assembly is that it provides a means of reducing the effect of the field reradiated from the nearby vertical object to zero by the adjustment of the sense gain control.

An object of this invention is to disclose a plural loop antenna assembly which may be rotated at high speeds to provide an omnidirectional direction finding display on a cathode ray tube while providing sense indication at the same time.

Another object of this invention is to disclose a mixing circuit for a three loop direction finding antenna which will shift the phase and vary the gain of the sense loop output relative to the spaced loop output so that reradiation distortion may be eliminated.

Other objects and many of the attendant advantages of this invention will be readily appreciated as the same becomes better understood by reference to the following detailed description when considered in connection with the accompanying drawings wherein.

Figure 1:
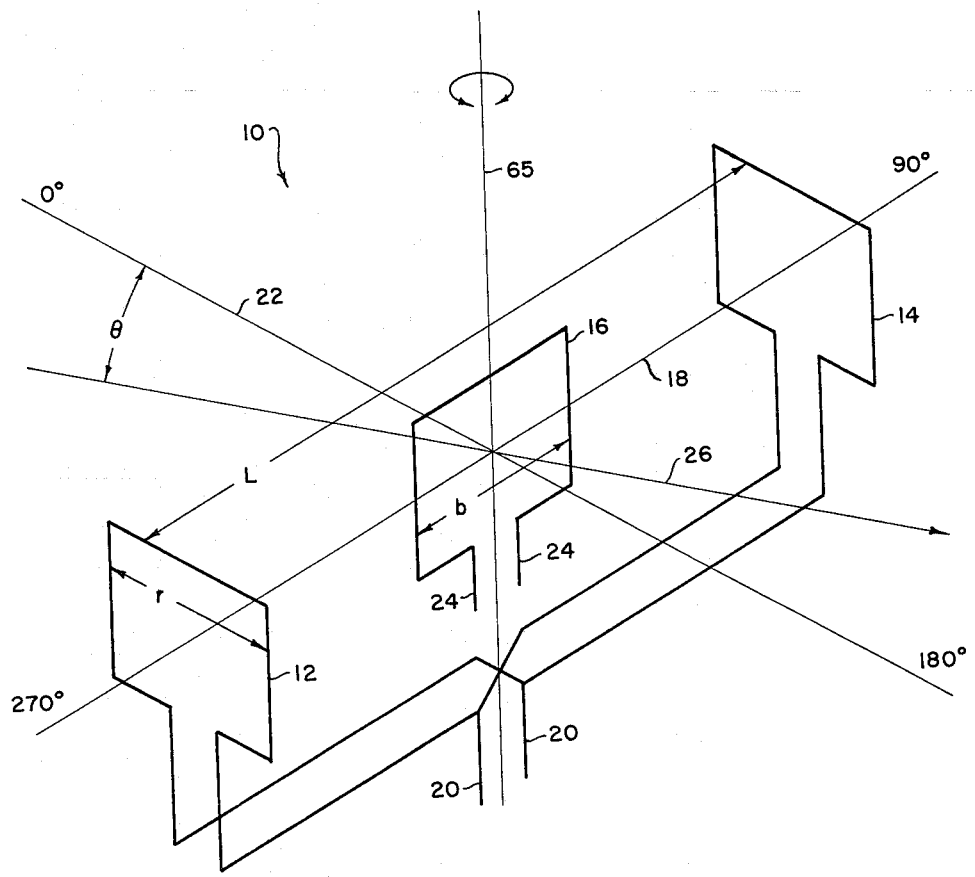
FIG. 1 is a schematic view of the three loop antenna assembly.

Referring now to the drawings, there is shown in FIG. 1 (which illustrates a preferred embodiment) a three loop antenna assembly 10 comprising two rectangular spaced loops 12 and 14 and a central sense loop 16.

The two spaced loops 12 and 14 are mounted a distance L apart coaxially on axis 18 and have their output leads cross-connected underneath sense loop 16 to provide spaced loop output terminals 20. Sense loop 16 is mounted between the two spaced loops an orthogonal axis 22 and has output terminals 24.

An incident electromagnetic wave of wavelength $\lambda$ indicated as 26 having an angle $\theta$ with respect to the 0° axis 22 induces a response of $$E_{sp} = \cos(S \sin\theta + d \cos\theta) - \cos(S \sin\theta - d \cos\theta)$$

where, as further indicated on FIG. 1, $L$=spaced loop separation
$r$=diameter of a spaced loop
$\beta = 2\pi/\lambda$
$S = \beta L$
$d = \beta r$ $E_{sp}$ reduces to $$E_{sp} = -Sd \sin 2\theta$$

when $r$ and $L$ are much, much less than $\lambda$.

Figure 4:
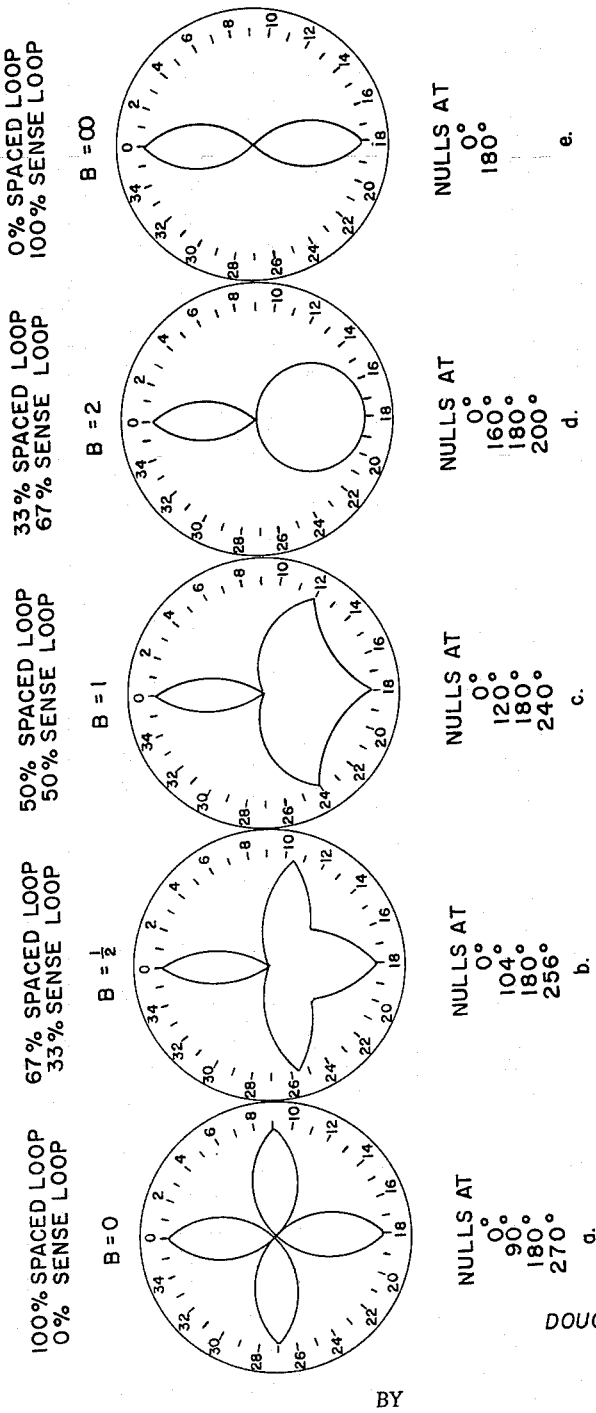
FIGS. 4 (a–e) are views of the theoretical response of the three loop antenna.

This equation has four nulls for every 360° variation of $\theta$ as shown in FIG. 4a where voltage maximums are plotted at the center of the circle and voltage minimums or nulls are plotted at the circumference. Azimuth indicia are numbered for every 20° with the 10° digit eliminated.

The response of the sense loop 16 is $$E_{sp} = ja \sin\theta$$

where $$a = \beta b$$

and as is shown in FIG. 4e.

When the sense loop output is shifted in phase by $\pi/2$ and subjected to a gain of $\delta$, the total combined response of the loops is:

$$R_T = Sd \sin 2\theta + a\delta \sin\theta$$

If we set $$B = \frac{\delta a}{Sd}$$

and divide by $Sd$, then the direction finding response is:

$$E_{DF} = \sin 2\theta + B \sin\theta$$

and as further shown in FIG. 4c where $B=1$. FIGS. 4b and 4d show the total response for $B=\frac{1}{2}$ and 2 respectively. FIGS. 4a and 4e are for $B=0$ and infinity corresponding to the patterns for a spaced loop and a simple loop respectively.

In the presence of a re-radiated field however, the response of a spaced loop as shown in FIG. 5a and the response of a simple loop as shown in FIG. 5k is highly distorted and inaccurate.

Figure 5:
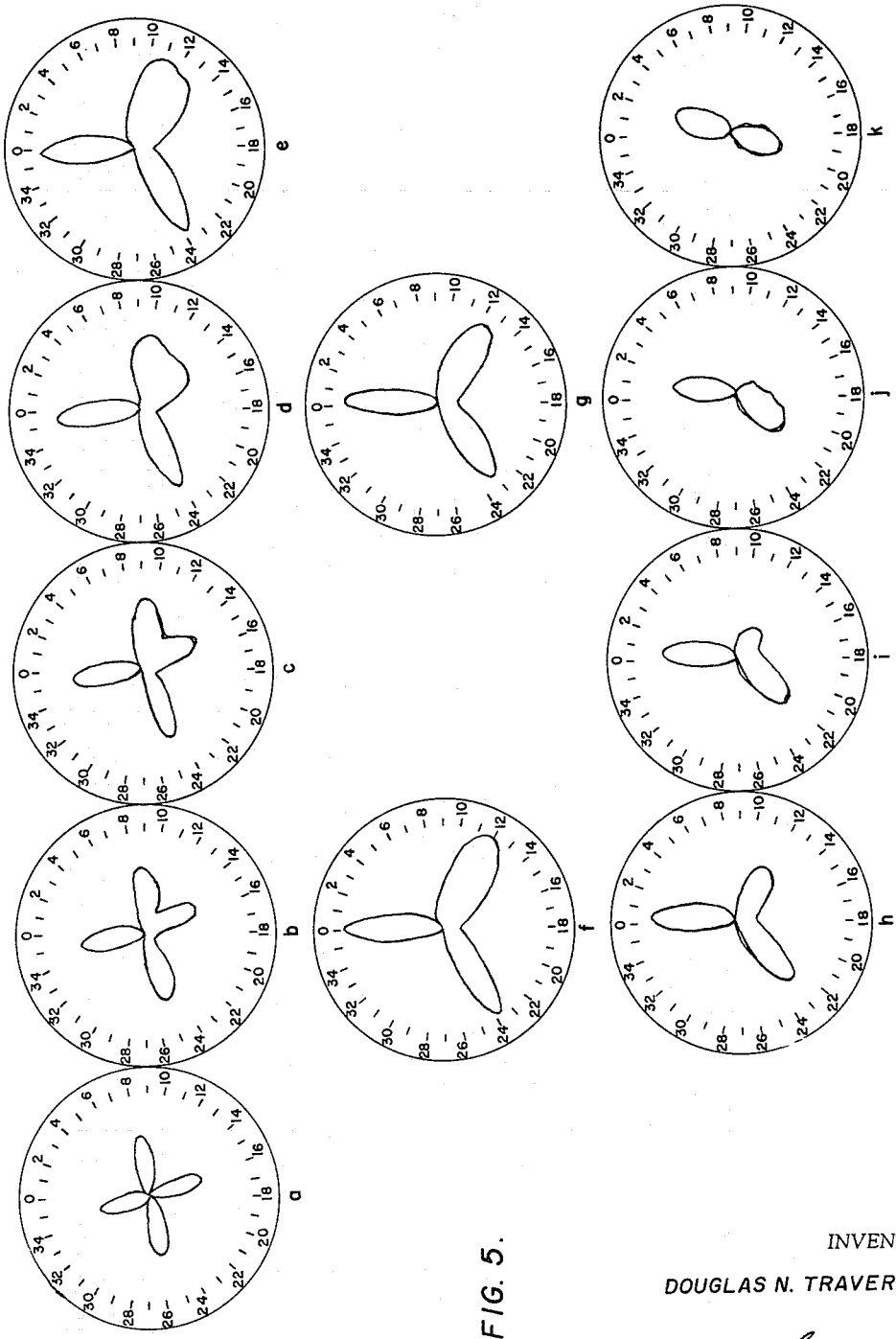
FIGS. 5 (a–k) are views of the pattern variations of the three loop antenna system as displayed on a cathode ray tube.

FIG. 5 is a drawing of the actual response of a three loop antenna for $B=0$ in FIG. 5a to $B=$infinity in FIG. 5k where the primary field was at 0°, and the secondary field was at 240°. The secondary field was 70% of the primary field in amplitude and was at a phase angle of 112½° relative to the primary field.

For the pure spaced loop condition (FIG. 5a) the bearing is approximately 348° with a resultant error of −12°. For the pure simple loop condition (FIG. 5k) the bearing is approximately 22° with a resultant error of 22°. As the sense gain is advanced from the pure spaced loop condition, a distorted sense pattern becomes apparent, and the forward null swings from the spaced loop bearing to the simple loop bearing passing through a zero error condition. The latter condition occurs when one of the sense nulls is coincident with the direction of the reradiated field. At this same point the blurring disappears.

The extreme pattern distortion which exists between nulls is caused by the relatively high amplitude of the reradiated field (70% of the primary), but it is not sufficient to prevent proper sense identification in this case. Note that the bearing error does not shift rapidly in the vicinity of the zero error condition shown in FIG. 5f, yet the blurring becomes quite noticeable with a slight change in sense gain. The latter effect may offer an additional criterion for proper sense adjustment once the general direction of the reradiated field is known.

The small size of the spaced and simple loop responses in FIGS. 5a and 5k, respectively, show that the nulls are very poor in the presence of a reradiated field as can be seen by comparison with FIGS. 4a and 4e.

The addition of the sense loop output in the proper phase and amplitude as shown by FIG. 5f demonstrates that an almost theoretically perfect null is obtained as when compared with FIG. 4c despite a reradiated electromagnetic wave of the same frequency which has an amplitude of 70% of that of the primary wave.

The test was repeated in a simplified form for 270 different combinations of the reradiated field amplitude, phase, and direction. The conditions for the reradiated field which were investigated were as follows:

(1) Amplitudes: .1, .3, .5, .7, and .9 relative to unity for the primary field.

(2) Phases: 0°, 22½°, 45°, 67½°, 90°, 112½°, 135°, 157½°, and 180° relative to the primary field.

(3) Directions: 330°, 300°, 270°, 240°, 210°, and 180° relative to the primary field.

It was not necessary to examine phases or directions beyond 180° because of symmetry. For the test the operator of the equipment was told to adjust the sense nulls until one became coincident with the known direction of the reradiated field.

The quality of the sense pattern was recorded in each case. Four types of sense patterns were observed. These can be described as correct sense, correct sense but poor, ambiguous sense and false sense. A correct sense pattern is one which would offer no difficulty for interpretation. A correct but poor sense pattern would be one where interpretation would be difficult if modulation or noise were present on the pattern. An ambiguous sense pattern would be one where the symmetry of the pattern would be such as to not indicate a direction for sense or to indicate a multiplicity of directions. A false sense pattern is one which appears as a normal pattern but indicates sense on an improper null. The recorded data is summarized in Tables One and Two.

TABLE ONE

*Sense Performance*

| Type of sense pattern | Percent incidence for various amplitudes | | | | | Average percent |
|---|---|---|---|---|---|---|
| | A=.1 | A=.3 | A=.5 | A=.7 | A=.9 | |
| Correct | 100 | 100 | 87 | 70 | 26 | 77 |
| Poor correct | 0 | 0 | 13 | 22 | 33 | 14 |
| Ambiguous | 0 | 0 | 0 | 4 | 30 | 7 |
| False | 0 | 0 | 0 | 4 | 11 | 3 |
| Total correct | 100 | 100 | 100 | 92 | 59 | 90 |

TABLE TWO

*Observed Bearing Performance (Omitting Ambiguous Patterns)*

| Type of antenna used | Average error magnitude for various amplitudes | | | | | Over-all average |
|---|---|---|---|---|---|---|
| | A=.1 | A=.3 | A=.5 | A=.7 | A=.9 | |
| Simple loop, deg | 2.8 | 7.9 | 11.1 | 22.1 | 40.0 | 16.8 |
| Spaced loop, deg | 1.1 | 4.5 | 6.4 | 13.1 | 27.9 | 10.6 |
| Three loop, deg | .7 | 2.4 | 3.6 | 10.1 | 18.8 | 7.1 |
| Spaced loop improvement factor over simple loop | 2.5 | 1.8 | 1.7 | 1.7 | 1.4 | 1.6 |
| Three loop improvement factor over simple loop | 4.0 | 3.3 | 3.1 | 2.2 | 2.1 | 2.4 |

Table One indicates that the number of false or possibly misleading sense patterns is negligible up to an amplitude of .7 for the secondary field. From $A=.7$ up, the number of not correct sense patterns increases rapidly. Unfortunately no comparable data for conventional simple loop systems are available. The analogous situation in the simple loop and monopole case is the sense reversal. Up to and including reradiated field strengths of 50% of the primary field the three loop system of producing sense appears to be satisfactory with little chance of error. In the general case of a multiplicity of reradiators however, some additional performance deterioration can be expected.

Table Two indicates the two to one performance improvement of the spaced loop over the simple loop is achieved at the lower amplitudes of the reradiated field. Improvement approaching this is achieved at the higher amplitudes. The improvement of the three loop system over the simple loop is better than three to one at the low amplitudes and two to one at the high amplitudes. Furthermore the improvement of the three loop system over the spaced loop amounts to an additional 50% or more. This is enough to justify the additional complexity of operating procedure, when the necessary information concerning the direction of the reradiated field is available.

Figure 2:
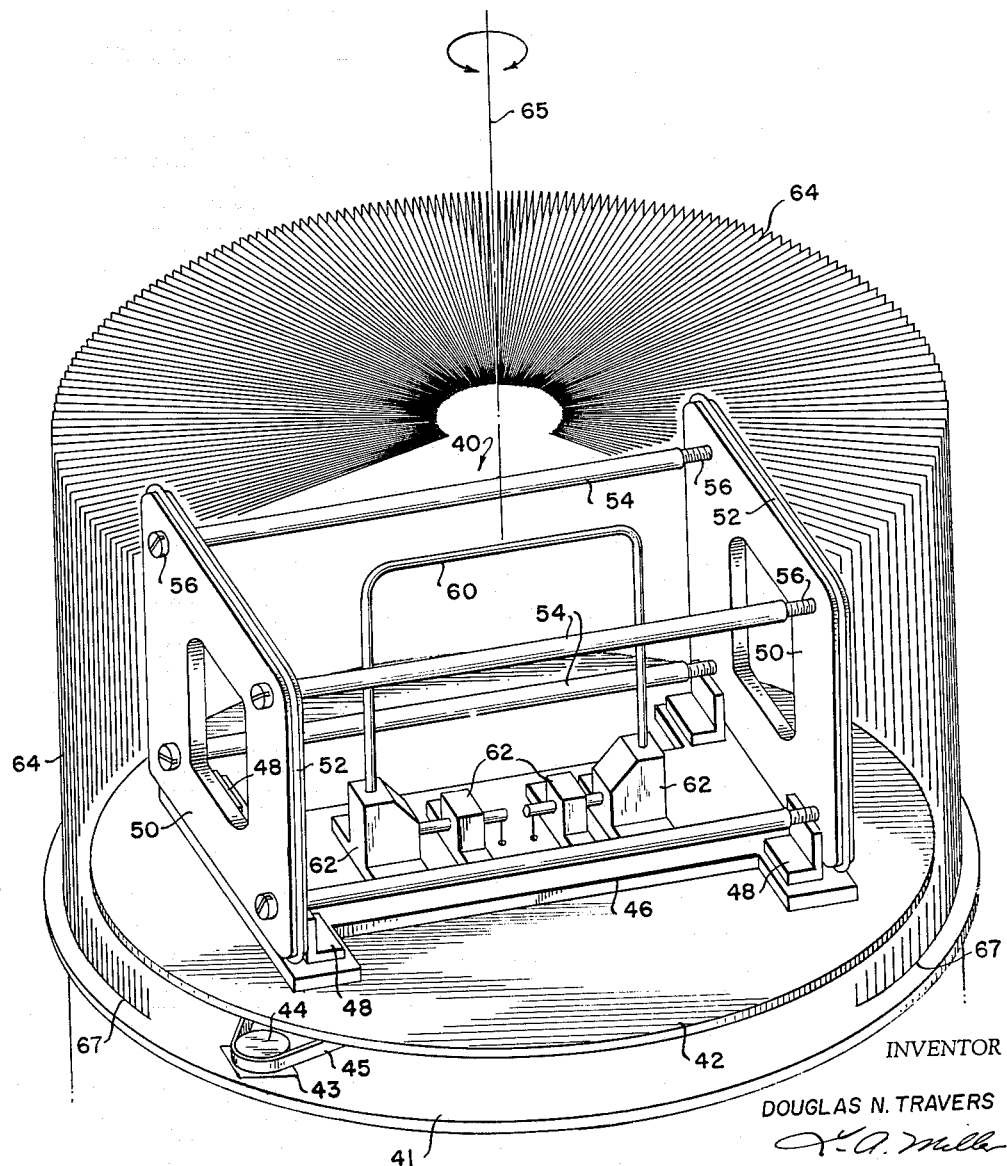
FIG. 2 is an isometric view of a preferred embodiment of the three loop antenna assembly.

Referring to FIG. 2, an isometric view of a preferred embodiment of the three loop antenna 40 is shown mounted on a rotatable plate 42 which is driven by a motor 43 at 600 r.p.m. through pulley 44 and Gilmer belt 45. Motor 43 and rotatably mounted plate 42 are mounted on stand 41. A base 46 supports angle brackets 48 which hold two plywood frames 50 for supporting the spaced loops 52.

The spaced loops 52 are mounted in grooves on the outer edges of frames 50 and are precisely placed relative to each other by means of four tubes 54 which are threadedly engaged with bolts 56. Loops 52 are 14 inches on a side spaced 23 inches apart for a 4500 cubic inch total displacement to provide accurate direction finding above 2 megacycles.

Sense loop 60 is 11 inches on a side and is supported between the two spaced loops 52 by holders 62. The output leads from the sense loop 60 and spaced loops 52 are conducted through base 46 and brought down to rotary transformers (not shown) for connection to the mixing circuit.

Since there may be reradiation from the mast supporting the three loop antenna, a cylindrical cage electrostatic shield 64 of the Faraday type has a lower ring 67 mounted on stand 41 and consists of a large number of conductors supported and insulated by a molded polyester plastic (not shown). The conductors are electrically connected to stand 41 at lower ring 67 and extend over the top of the antenna toward the vertical axis 65 of the antenna.

Figure 3:
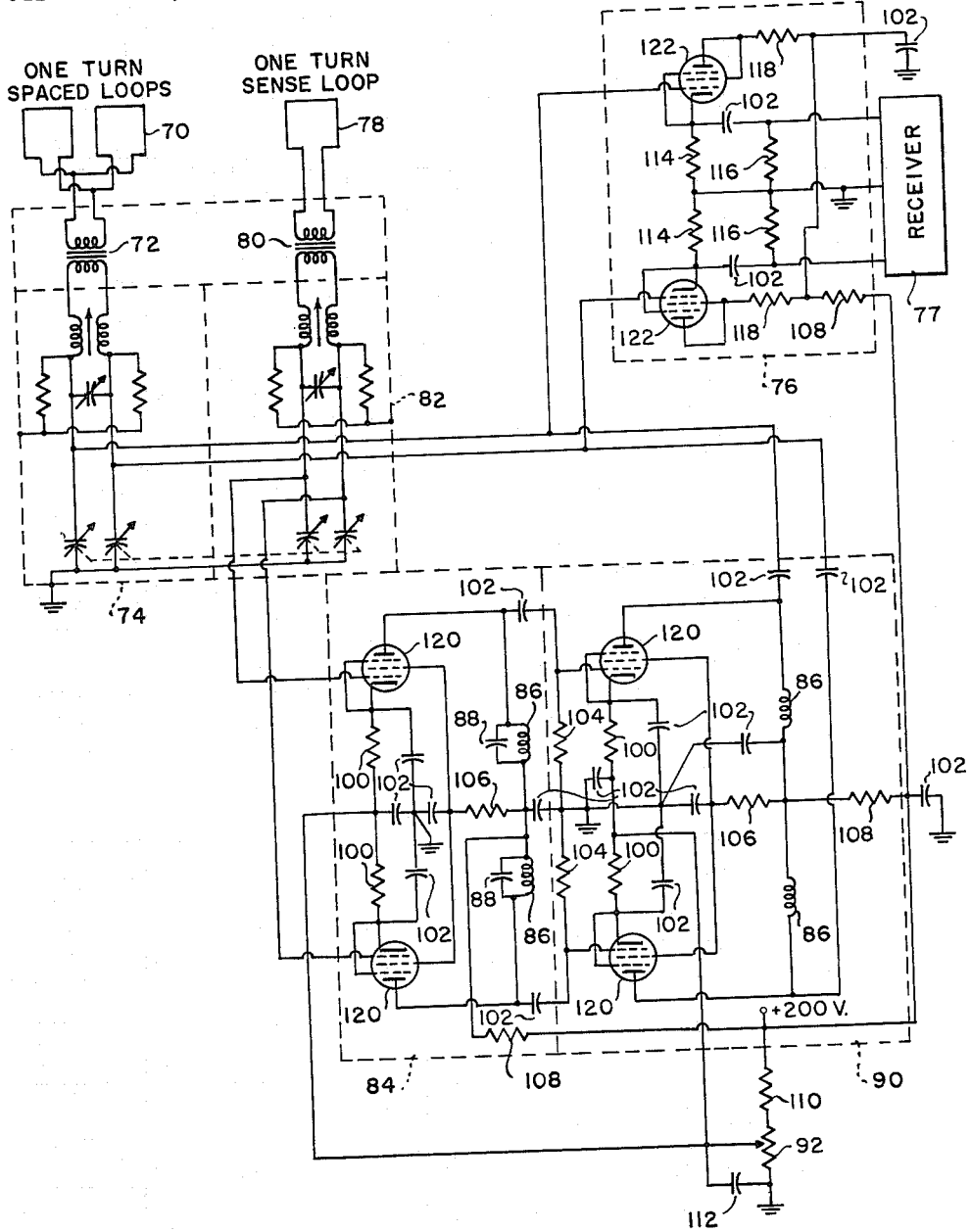
FIG. 3 is a schematic diagram of the three loop antenna mixing circuit.

A preferred embodiment of the mixing circuit is shown in schematic form in FIG. 3 where the spaced loops 70 are connected to rotary transformer 72 having a secondary tuning and balancing circuit 74. The output of the spaced loops is then connected to push-pull mixing cathode follower 76 and then to a radio receiver 77 such as an AN/SRD7 having a cathode ray tube display.

The sense loop 78 is connected to rotary transformer 80 and thence by tuning and balancing circuit 82 to a 90° phase shift amplifier 84. Low frequency chokes 86 are self resonant below 2 megacycles and have small capacitors 88 across them so that a reactive load to produce a 90° phase shift is used in amplifier 84.

Isolating amplifier 90 presents a high impedance to phase shift amplifier 84 so that the 90° phase shift will not be affected by the loading. Isolating amplifier 90 has its output connected to the input of mixing cathode follower 76 to mix the output of the sense loop 78 in the proper phase and amplitude with the output of the spaced loops 70. Isolating amplifier 90 is tuned to resonance to have a resistive load with no phase shift by tuning and balancing circuit 74.

The amplitude of the sense loop 78 output is varied by the sense gain control potentiometer 92 which varies the cathode potential and thereby the gain of amplifiers 84 and 90.

In a preferred embodiment of the mixing circuit the following components were used.

| | |
|---|---|
| Chokes 86 | .3 mh. |
| Capacitors 88 | 25 micromicrofarads. |
| Potentiometer 92 | 10,000 ohms. |
| Resistors 100 | 180 ohms. |
| Capacitors 102 | .02 microfarad. |
| Resistors 104 | 1 megohm. |
| Resistors 106 | 1,000 ohms. |
| Resistors 108 | 470 ohms. |
| Resistor 110 | 100,000 ohms. |
| Capacitor 112 | 20 microfarads. |
| Resistors 114 | 150 ohms. |
| Resistors 116 | 10,000 ohms. |
| Resistors 118 | 100 ohms. |
| Tubes 120 | 6AH6. |
| Tubes 122 | 6AU6. |

The three loop antenna and mixing circuit as thus disclosed provide a means for accurate direction finding and sense indication despite the presence of high amplitude reradiated fields.

In addition the three loop antenna may be rotated continuously to provide direction finding and sense indication at all times.

Obviously many modifications and variations of the present invention are possible in the light of the above teachings. It is therefore to be understood that within the scope of the appended claims the invention may be practiced otherwise than as specifically described.

What is claimed is:

1. A three loop direction finder antenna system comprising a pair of coaxial spaced loop antennas having a cross-connected output, a sense loop antenna mounted at a right angle to said spaced loop antennas and having an output, a phase shift amplifier connected to said sense loop output and having a substantially capacitive load to provide a 90° phase shift, an isolating amplifier connected to said phase shift amplifier and having an output, tuning means connected between said spaced loop output and said isolating amplifier output for mixing said sense loop and spaced loop output and to provide a substantially resistive load to said isolating amplifier, a receiver for displaying the response of said antennas, and a cathode follower connected between said tuning means and said receiver.

2. A three loop direction finder antenna system according to claim 1 and further characterized by said amplifiers having a variable gain control for adjusting the amplitude of said sense loop output relative to said spaced loop output.

3. A three loop direction finder antenna system according to claim 1 and further characterized by said amplifiers comprising push-pull amplifiers for minimum distortion.

4. A three loop direction finder antenna system comprising a pair of coaxial spaced loop antennas having a cross-connected output for direction finding, a sense loop antenna mounted at a right angle to said spaced loop antennas and having an output, and means for mixing said outputs in the proper phase and amplitude whereby the effect of reradiated fields may be reduced, said mixing means having means for adjusting the amplitude of said sense loop antenna output whereby a null response of said antenna system may be placed in the direction of a reradiating field.

5. A three loop direction finder antenna system comprising a pair of coaxial spaced loop antennas having a cross-connected output for direction finding, a sense loop antenna mounted at a right angle to said spaced loop antennas and having an output, means for mixing said output in the proper phase and amplitude whereby the effect of reradiated fields may be reduced, said mixing means having means for adjusting the amplitude of said sense loop antenna output whereby a null response of said antenna system may be placed in the direction of a reradiating field, and means connected to said mixing means for displaying the response of said three loop antenna whereby the effect of reradiated fields may be observed.

6. A three loop direction finder antenna system comprising a pair of coaxial spaced loop antennas having a cross-connected output for direction finding, a sense loop antenna mounted at a right angle to said spaced loop antennas and having an output, means attached to said antennas for rotation thereof at a constant speed whereby a 360 degree azimuth display of the response of said direction finder may be provided, means for mixing said output in the proper phase and amplitude whereby the effect of reradiated fields may be reduced, said mixing means having means for adjusting the amplitude of said sense loop antenna output whereby a null response of said antenna system may be placed in the direction of a reradiating field, and means connected to said mixing means for displaying the response of said three loop antenna whereby the effect of reradiated fields may be observed.

7. A three loop direction finder antenna comprising a plate, a base mounted on said plate, a pair of rectangular coaxial spaced loop antennas mounted on said base and having a cross-connected output, a rectangular sense loop mounted on said base between and at a right angle to said spaced loops, a constant speed motor having a rotating pulley connected to said plate by a Gilmer timing belt for rotating said antennas to provide a 360 degree azimuth response, and a cylindrical electrostatic shield mounted around said antennas to minimize antenna support reradiation.

References Cited in the file of this patent

UNITED STATES PATENTS

| | | |
|---|---|---|
| 2,226,379 | Kummich et al. | Dec. 24, 1940 |
| 2,297,249 | Runge | Sept. 29, 1942 |
| 2,943,323 | Ryan | June 28, 1960 |